United States Patent Office 3,334,468
Patented Aug. 8, 1967

3,334,468
METHOD OF DRYING GAS STREAMS
Leroy A. Wilcox, Ludington, Mich., assignor to The Dow Chemical Company, Midland, Mich., a corporation of Delaware
No Drawing. Filed Oct. 27, 1966, Ser. No. 589,829
5 Claims. (Cl. 55—35)

The present application is a continuation-in-part of my copending application Ser. No. 394,057, filed Sept. 2, 1964, which is in turn a continuation-in-part of application Ser. No. 290,614, filed June 26, 1963 and both applications now abandoned.

This invention relates to an improved method of drying gas streams, and more particularly to a method of avoiding bridging and channeling in drying gas streams using calcium chloride as the drying agent.

Commercial grade calcium chloride is a common material used in the removal of water from gas streams. Ordinarily, the calcium chloride to be employed is charged into a gas drying tube or other like apparatus in the form of solid lumps or discrete particles to form a bed. As the first small amount of water is removed from the gas stream, an aqueous solution of calcium chloride develops on the surface of the solid calcium chloride lump. In effect, then, most of the drying of the gas stream is accomplished by contact of the gas with aqueous calcium chloride solution. As gases containing water are passed through the calcium chloride bed, aqueous calcium chloride solution accumulates and tends to flow downwardly between the solid lumps. Ideally, the aqueous solution flows to the bottom of the apparatus and is removed, fresh lumps of calcium chloride being added at or near the top of the apparatus as the solution reduces the amount of solid calcium chloride present in the bed. Heretofore, however, this flow of aqueous solution generally caused agglomeration of solid calcium chloride lumps, particularly smaller lumps or those reduced in the size because of the dissolving action of water obtained from the gas stream. Agglomeration of calcium chloride generally results in phenomena known as "bridging" and "channeling."

Bridging is the formation of a solid connecting link between the calcium chloride lumps by the migration of the solid, by fusion in the region where the lumps touch, by liquefaction with a subsequent solidification, or a combination of the above. As the lumps of calcium chloride dissolve these connecting links form an interconnecting structure, which has enough strength to support the remainder of the bed, thus preventing the downward movement of particles or lumps of calcium chloride, making it, moreover, difficult to clean out or recharge the bed.

Channeling usually occurs with smaller sized material. Channeling is the formation of tunnel-like pathways, or channels, through the bed caused by the preferential flow of gas and by linking together of the lumps. Formation of bonds between the lumps then prevents movement of the bed which would destroy said pathways or channels. Channeling thus reduces the effective surface area of calcium chloride exposed to the gas stream.

Accordingly, the design of calcium chloride drying units is limited because of such bridging and channeling. When bridging and channeling occur the efficiency of the calcium chloride drying unit is reduced since the gas to be dried has less and less contact with the calcium chloride. Moreover, bridging tends to prevent the body of calcium chloride pellets from moving downwardly in the drying unit as the drying operation proceeds and makes it difficult to remove the calcium chloride residue from the dryer.

I have discovered a method whereby bridging and channeling of calcium chloride drying beds may be substantially prevented, and the efficient life of the bed extended thereby. Further, in the method of my invention the apparatus is easily cleaned and recharged, keeping maintenance and operation costs to a minimum.

In accordance with the present invention, one or more additive materials selected from the group consisting of sodium chloride, and sodium carbonate in a particular size for controlling bridging and channeling is admixed with finely divided substantially anhydrous calcium chloride and the mixture formed by pelleting means into discrete solid masses such as lumps, pellets or the like for use in a drying bed. The additive materials may be operably present in an amount of from about 0.2 to about 20 percent, but ordinarily the additives are present in an amount of from about 0.5 to about 10 percent by weight and preferably from about 2 to 5 percent by weight. When commercial grade calcium chloride is employed, the above amounts are in addition to the normal impurities primarily of potassium and sodium chlorides found therein, since as shown in the examples hereinafter, said impurities do not avoid the phenomena of bridging and channeling. It is apparently due to the lack of proper particle size of the impurity materials in the commercially available calcium chloride. For this reason the amounts of additive material as specified herein above are in addition to the amounts present of any impurities in commercial calcium chloride.

Operably, the size of the additive material particles are within the range of from about −14 to about +100 mesh and preferably from about −30 to about +80 mesh. All mesh sizes herein are U.S. Standard Sieve sizes. The size of the final calcium chloride lumps or pellets containing the additive material in the mesh size for the additive specified hereinbefore is not particularly limited. A suitable size for such calcium chloride lumps is, for example, from about ⅛ to about 1½ inches, or from about −2 to +20 mesh.

Usually, suitable beds in accordance with the present invention are prepared as by filling a tube or column with pellets or lumps of calcium chloride containing one or more of the additive materials. Gas to be dried is passed through the tube or column, thereby contacting the bed to effect removal of water from the gas. As needed, additional lumps or pellets may be added to the bed as make up. In so doing, the gas is dried without detrimental bridging and channeling occurring in the drying bed, even over extended periods.

The amount of water to be removed from the gas stream may be controlled by varying the bed thickness, residence time of the gas stream in the bed, temperature and the like, as may readily be determined by one skilled in the art.

In general, the additive-containing calcium chloride pellets or lumps of the present invention remove substantially the same amount of water from a given gas as the equivalent weight of pure calcium chloride will remove when said calcium chloride is in its initial unbridged, unchanneled condition. Over a period of time, pellets or lumps of the present invention show a much higher efficiency and life than pure calcium chloride, since the problem of bridging and channeling are substantially eliminated. The less soluble additive material in calcium chloride when present in the mesh size specified apparently weakens any bridging that may occur between lumps of calcium chloride in the bed during drying of gas streams since the crystals of additive, when in said mesh size, act in effect as weak points or defects in the structure, thereby causing any bridging to collapse and allowing the CaCl₂ pellet bed to move downwardly.

A better understanding of the present invention may be had in the light of the following examples which are set forth to illustrate, and are not be be construed to limit, the present invention.

*Example I*

Calcium chloride (commercial grade) pellets 1⅛ inches in diameter by 1 inch in height containing about 1 percent of sodium corbonate particles, having a particle size of from about —60 to about +80 mesh, were prepared and charged into a 4-inch diameter vertical column made of glass to form a bed of said pellets 13 inches high. Moist air having a relative humidity of about 72 percent at room temperature was then passed through the column so-charged for about a week. Removal of the water from the air stream was noted as excellent with no observable bridging or channeling occurring.

*Example II*

Calcium chloride pellets containing 2 percent of sodium carbonate monohydrate particles having a mesh size of from about —60 to about +80 were prepared and used as in Example I, except that the relative humidity of the moist air was from about 95–100 percent. Drying was continued until the bed was nearly consumed. Again no bridging had occurred during drying.

*Example III*

Various samples of calcium chloride pellets were prepared each containing about 2 percent of sodium chloride particles. The particle size of the sodium chloride in the pellets of each sample varied within a particular mesh size range. A batch of pellets of each sample was used for drying moist air having a relative humidity of from 95–100 percent at room temperature by passing said moist air at a velocity of about 0.68 cubic feet per second through a 4-inch diameter column charged with said pellets similarly as in Example I until the bed was nearly consumed. The following table gives the mesh size of the sodium chloride in the pellets and also the drying results obtained for each sample.

| Sample | Sizes of NaCl Less Than— | Particles Greater Than— | Drying Results |
|---|---|---|---|
| 1 | 10 | 20 | A little bridging. |
| 2 | 20 | 40 | No bridging. |
| 3 | 40 | 60 | Do. |
| 4 | 80 | 100 | Do. |

*Example IV*

A sample of calcium chloride pellets was prepared using about 2 percent of sodium chloride as an additive material. The additive material ranged in particle size as follows:

| | Percent |
|---|---|
| —10 to +20 mesh | 0.2 |
| —20 to +40 mesh | 33.8 |
| —40 to +60 mesh | 45.0 |
| —60 to +80 mesh | 17.3 |
| —80 to +100 mesh | 2.5 |
| Balance finer than 100 mesh | 1.2 |

A batch of pellets from this sample was used for drying as in Example III above. No observable bridging was observed even after a week's use.

*Example V*

Calcium chloride pellets were prepared containing 0.50 percent sodium chloride particles as a filler having a mesh size within the range of from —60 to +80 mesh and used for drying an air stream of 95–100% relative humidity until the drying bed was nearly consumed. Only a small amount of bridging was observed. This amount of bridging was not detrimental to the drying operation.

*Example VI*

Similarly as in Example V, calcium chloride pellets were prepared containing 10 percent of —60 to +80 mesh particles of sodium chloride as an additive. In this case nor bridging was observed.

*Comparative example A*

Commercial grade anhydrous calcium chloride pellets of a mesh size from about —⅜ to about +20 mesh, containing from about 0.8 to about 1.0% by weight of NaCl as an impurity, but no filler material, were charged into a vertical column made of glass and about 4 inches in diameter, thereby forming a bed 13 inches in height. Air, containing water at about 70 percent humidity, was introduced to the column at the bottom and was discharged at the top. The air had a superficial velocity through the column of about ½ foot per second. After a short time of operation (about 2 days), the pellets had bridged and severe channeling had occurred.

*Comparative example B*

Using commercial grade anhydrous calcium chloride pellets of about ½ inch in diameter in the apparatus described above in Example A, it was observed that bridging occurred after a short time of operation. Another batch of calcium chloride was ground and pressed into tablets having dimentions of about 1⅛ inch in diameter by about 1 inch in height. Bridging was observed after a short interval of exposure (less than 2 days) to 70 percent humidity air. The test was repeated again employing an air stream having a relative humidity of about 95–100 percent flowing at a rate of about 0.68 cubic feet per second through the dryer. The same undesirable results as to bridging were obtained.

Various modifications may be made in the present invention without departing from the spirit or scope thereof, and it is to be understood that I limit myself only as defined in the appended claims.

I claim:
1. An improved method of drying gas streams providing a uniform mixture consisting essentially of calcium chloride and at least one particulated additive material selected from the group consisting of sodium chloride, and sodium carbonate, said additive material being present in an amount by weight of from about 0.2 to about 20 percent and within a size range of from 14 to 100 mesh, forming said mixture into discrete masses, providing a bed of said discrete masses, and passing the gas stream to be dried through said bed.
2. The method of claim 1 wherein the selected additive material is sodium chloride.
3. The method of claim 1 wherein the selected additive material is sodium carbonate.
4. The method of claim 1 wherein the additive material is within a size range of from about 30 to about 80 mesh.
5. The method of claim 1 wherein the additive material is present in the mixture in an amount of from about 2 to about 5 percent.

References Cited

UNITED STATES PATENTS

| 1,988,740 | 1/1935 | Kingman | 252—194 |
| 2,008,489 | 7/1935 | Cousins | 252—194 |
| 2,039,512 | 5/1936 | Baker | 55—35 |

REUBEN FRIEDMAN, *Primary Examiner.*

C. HART, *Assistant Examiner.*